Patented Jan. 25, 1927.

1,615,637

UNITED STATES PATENT OFFICE.

HANS LEHRECKE, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF NEW YORK.

PROCESS FOR EVOLUTION OF HYDROCYANIC ACID FROM CYANIDES.

No Drawing. Application filed November 21, 1925, Serial No. 70,708, and in Germany November 27, 1924.

The evolution of hydrocyanic acid from cyanides, for example such as those of the alkali metals by salts of metals which are capable of forming unstable or readily hydrolyzable cyanides, is usually accomplished by first dissolving the cyanide, for example sodium cyanide, in water, then the salt which is used for the evolution of hydrocyanic acid, for example such as a salt of aluminum, magnesium or zinc, is added to the solution. This method of operation has the disadvantage that the salts must be separately carried to the place of use and there measured out; this is a very difficult method especially in the treatment of trees with hydrocyanic acid which is carried out only at night. The use of prepared mixtures of cyanides with metal salts, which are useful in the evolution of hydrocyanic acid, together with salts which have a high heat of hydration, for example, calcium chloride, has the disadvantage that during the treatment of this mixture with water considerable polymerization of hydrocyanic acid takes place.

It has now been found that the prepared mixtures of the above sort can be decomposed with water, without polymerization, if acid-reacting substances are present which are able to neutralize and transform into soluble compounds the hydroxides, such as aluminum hydroxide or magnesium hydroxide, as are formed by the reaction in this process. Such addition substances are acid salts, for example bisulfates, or acids, as for example boric acid, can be used. The amount of acid substance to be added is regulated by the amount of the hydroxide formed. Preferably the acid substance is used in excess, for example ½ to 2 times as much as would be necessary for the neutralization of the hydroxide formed.

A mixture suitable for the evolution of hydrocyanic acid can have for example the following composition:

100 grams sodium cyanide.
300 grams dehydrated magnesium sulfate.
200–235 grams potassium bisulfate.

By treating this mixture with about 800 cc. water which has preferably been heated to about 50–80° C., a rapid and complete evolution of hydrocyanic acid is obtained with a minimum of loss through undesired side reactions, such as for example, polymerization.

By adding substances which are capable under similar conditions of evolving halogens, such as calcium hypochlorite, magnesium hypochlorite, and the like the further advantage is obtained that irritant gases such as cyanogen chloride are evolved along with the hydrocyanic acid due to the reaction of these products with a part of the hydrocyanic acid.

In the preparation of these mixtures one can regulate the amount of salt added to the cyanides so that, following the reaction, the water is either completely, or to a large extent, taken up by the added salts or combined with them as water of crystallization. In these cases also it has been found that excessive polymerization of hydrocyanic acid does not take place.

What I claim is:

1. In a process for evolving hydrocyanic acid from metal cyanides by treatment with water and salts of metals whose cyanides are readily hydrolyzed, the step which consists in adding an acid salt which will neutralize the alkaline salt formed in the reaction.

2. In a process for evolving hydrocyanic acid from alkali metal cyanide by treatment with water and salts of metals whose cyanides are readily hydrolyzed, the step which consists in adding an acid salt which will neutralize the alkaline salt formed in the reaction.

3. In a process for evolving hydrocyanic acid from sodium cyanide by treatment with water and salts of metals whose cyanides are readily hydrolyzed, the step which consists in adding an acid salt which will neutralize the alkaline salt formed in the reaction.

4. In a process for evolving hydrocyanic acid from sodium cyanide by treatment with water and dehydrated magnesium sulphate, the step which consists in adding an acid salt which will neutralize the alkaline salt formed in the reaction.

5. In a process for evolving hydrocyanic acid from sodium cyanide by treatment with water and dehydrated magnesium sulphate, the step which consists in adding potassium bisulphate which will neutralize the alkaline salt formed in the reaction.

6. Product for the evolution of hydrocyanic acid by treatment with water, composed of a mixture of a metallic cyanide, a salt of a metal whose cyanide is readily hydrolyzed and an acid salt.

7. Product for the evolution of hydrocyanic acid by treatment with water, composed of a mixture of a metallic cyanide, a salt of a metal whose cyanide is readily hydrolyzed, a salt of high heat of hydration, and an acid salt.

8. Product for the evolution of hydrocyanic acid by treatment with water, composed of a mixture of sodium cyanide, anhydrous magnesium sulphate and potassium bisulphate.

9. Product for the evolution of hydrocyanic acid by treatment with water, composed of a mixture of sodium cyanide, anhydrous magnesium sulphate, magnesium hypochlorite and potassium bisulphate.

Signed at Frankfort a/m., Germany, this 31st day of October A. D. 1925.

HANS LEHRECKE.